(12) United States Patent
Taverner

(10) Patent No.: US 9,778,078 B2
(45) Date of Patent: Oct. 3, 2017

(54) TIME DIVISION MULTIPLEXING (TDM) AND WAVELENGTH DIVISION MULTIPLEXING (WDM) FAST-SWEEP INTERROGATOR

(71) Applicant: Weatherford Technology Holdings, LLC, Houston, TX (US)

(72) Inventor: Domino Taverner, Delray Beach, FL (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 527 days.

(21) Appl. No.: 14/276,792

(22) Filed: May 13, 2014

(65) Prior Publication Data

US 2014/0340235 A1    Nov. 20, 2014

Related U.S. Application Data

(60) Provisional application No. 61/824,274, filed on May 16, 2013.

(51) Int. Cl.
*G01N 21/55* (2014.01)
*G01D 5/353* (2006.01)
(Continued)

(52) U.S. Cl.
CPC ......... *G01D 5/35354* (2013.01); *G01D 5/353* (2013.01); *G01D 5/35316* (2013.01);
(Continued)

(58) Field of Classification Search
CPC ...... G01N 21/55; H04B 10/071; E21B 47/12; G02B 6/26; G02B 5/26; G02B 6/29319;
(Continued)

(56) References Cited

U.S. PATENT DOCUMENTS 5,680,489 A * 10/1997 Kersey ............... G01D 5/35383
356/35.5
8,379,297 B2    2/2013 Taverner
(Continued)

FOREIGN PATENT DOCUMENTS

EP    0859477 A2    8/1998
GB    2419184 A     4/2009

OTHER PUBLICATIONS

International Search Report and Written Opinion dated Oct. 10, 2014 issued by the European Patent Office in corresponding Application No. PCT/US2014/038126.
(Continued)

*Primary Examiner* — Jamil Ahmed
(74) *Attorney, Agent, or Firm* — Patterson & Sheridan, L.L.P.

(57) ABSTRACT

Methods and apparatus for fast sweeping a spectral bandwidth in order to distinguish among signals received from effectively wavelength division multiplexed (WDMed) and time division multiplexed (TDMed) optical components on a single fiber. For some embodiments, a method for interrogating optical elements having characteristic wavelengths spanning a sweep range is provided. The method generally includes introducing a pulse of light, by an optical source, into an optical waveguide to interrogate at least a first set of optical elements having different characteristic wavelengths by performing a sweep of wavelengths over a period of the pulse, wherein the period is less than a round-trip time for light reflected from an optical element closest to the optical source to reach a receiver and processing the reflected light to determine a parameter based on the times at which signals are received.

20 Claims, 11 Drawing Sheets

(51) Int. Cl.
*G01L 1/24* (2006.01)
*G01K 11/32* (2006.01)
*G02B 6/293* (2006.01)

(52) U.S. Cl.
CPC ..... *G01D 5/35387* (2013.01); *G01K 11/3206* (2013.01); *G01L 1/246* (2013.01); *G02B 6/29319* (2013.01)

(58) Field of Classification Search
CPC ............... G01D 5/353; G01D 5/35316; G01D 5/35354; G01D 5/35387; G01K 11/3206; G01L 1/246; G01L 1/247
See application file for complete search history.

(56) References Cited

U.S. PATENT DOCUMENTS 8,400,640 B2 3/2013 Kim et al.
2007/0280703 A1 12/2007 Taverner
2008/0296480 A1 12/2008 Haber et al.
2009/0174931 A1 7/2009 Huber et al.
2009/0290160 A1 11/2009 Taverner
2010/0128348 A1* 5/2010 Taverner ............... G01J 3/1895
359/572

OTHER PUBLICATIONS

Huber et al., "Fourier domain mode locked lasers for OCT imaging at up to 290 kHz sweep rates," Proceedings of SPIE, OSA Biomedical Optics, SPIE, US vol. 5861, Dec. 31, 2005, pp. 1-6.
U.S. Appl. No. 14/076,766, filed Nov. 11, 2013, entitled "Time Delay Compensation for Optical Waveguides Using a Bidirectional Wavelength Scan."
British Search Report dated Oct. 8, 2014, issued by the Intellectual Property Office of South Wales in Application No. GB1408526.0.

* cited by examiner

TIME DIVISION MULTIPLEXING (TDM) AND WAVELENGTH DIVISION MULTIPLEXING (WDM) FAST-SWEEP INTERROGATOR

CLAIM OF PRIORITY UNDER 35 U.S.C. §119

This application claims benefit of U.S. Provisional Patent Application Ser. No. 61/824,274, filed May 16, 2013 and entitled "Time Division Multiplexing (TDM) and Wavelength Division Multiplexing (WDM) Fast-Sweep Interrogator," which is herein incorporated by reference in its entirety.

BACKGROUND OF THE INVENTION

Field of the Invention

Embodiments of the present invention generally relate to interrogation of optical components and, more particularly, to techniques and apparatus for fast sweeping a spectral bandwidth in order to distinguish among effectively wavelength division multiplexed (WDMed) and time division multiplexed (TDMed) optical components on a single fiber.

Description of the Related Art

Many optical components have a characteristic wavelength that may be found by interrogating the optical component with an optical source capable of producing light at various wavelengths over a fixed range or bandwidth. For example, fiber Bragg gratings (FBGs) (typically formed by photo-induced periodic modulation of the refractive index of an optical waveguide core) are highly reflective to light having wavelengths within a narrow bandwidth centered at a wavelength generally referred to as the Bragg wavelength. Because light having wavelengths outside this narrow bandwidth is passed without reflection, Bragg wavelengths can be determined by interrogating a Bragg grating with a light source swept across a bandwidth that includes the Bragg wavelength and monitoring the reflected optical power spectrum at a receiver unit. Because Bragg wavelengths are dependent on physical parameters, such as temperature and strain, Bragg gratings can be utilized in optical sensor systems to measure such parameters.

In these and a wide range of other types of optical systems, the measurement of a characteristic wavelength of an optical component to great accuracy (and/or with great repeatability) is important to system performance. Two significant parameters determining the error of any such measurement are the signal-to-noise ratio (SNR) and effective integration time of the measuring system. SNR is dependent on many factors including received optical power, optical-source noise, and receiver noise. The effective integration time is dependent on overall averaging time and the proportion of that time which is producing useful signals at the receiver unit. Improving these two parameters can improve characteristic wavelength measurement repeatability and accuracy.

Conventional swept-wavelength Bragg grating interrogators are limited in the number of sensors that can be interrogated on a single fiber by the optical bandwidth of the source because only wavelength division multiplexing (WDM) is used to interrogate the sensors. Many of the applications using Bragg grating sensors can be improved by increasing the number of sensors in the system.

In some cases, this problem has been addressed by increasing the optical bandwidth of the light source to enable more sensors to be multiplexed on the optical fiber using WDM.

In other cases, a swept-wavelength interferometry technique has been used. This technique may allow time division multiplexing (TDM) of grating sensors; however, the swept-wavelength interferometry technique may suffer from a limited spatial window range as well as limited wavelength resolution. In yet another approach, time-gated lasers have been used to TDM Bragg grating sensors.

Accordingly, techniques and apparatus to successfully measure more sensors on a single optical fiber are desirable.

SUMMARY OF THE INVENTION

Embodiments of the present invention generally provide methods and apparatus for fast sweeping a spectral bandwidth in order to distinguish among signals reflected from effectively wavelength division multiplexed (WDMed) and time division multiplexed (TDMed) optical components on a single fiber.

One embodiment of the present invention is a method for interrogating optical elements having characteristic wavelengths spanning a sweep range. The method generally includes introducing a pulse of light, by an optical source, into an optical waveguide to interrogate at least a first set of optical elements having different characteristic wavelengths by performing a sweep of wavelengths over a period of the pulse, wherein the period is less than a round-trip time for light reflected from an optical element closest to the optical source to reach a receiver; and processing the reflected light to determine a parameter.

Another embodiment of the present invention is an apparatus for interrogating optical elements having characteristic wavelengths spanning a sweep range. The apparatus generally includes an optical waveguide; an optical source configured to introduce a pulse of light into the optical waveguide to interrogate at least a first set of optical elements having different characteristic wavelengths by performing a sweep of wavelengths over a period of the pulse; a receiver, wherein the period is less than a round-trip time for light reflected from the optical element closest to the optical source to reach the receiver; and a processing system configured to process the reflected light from the optical elements to determine a parameter.

Yet another embodiment of the present invention is a system for interrogating optical elements having characteristic wavelengths spanning a sweep range. The system generally includes a wellbore; an optical waveguide at least partially disposed in the wellbore; an optical source configured to introduce a pulse of light into the optical waveguide by performing a sweep of wavelengths over a period of the pulse; at least a first set of optical elements disposed along the optical waveguide and having different characteristic wavelengths which reflect interrogating light at the characteristic wavelength; a receiver, wherein the period is less than a round-trip time for light reflected from the optical element closest to the optical source to reach the receiver; and a processing system configured to process the reflected light from the optical elements to determine a parameter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not

DETAILED DESCRIPTION

Embodiments of the present invention provide for fast sweeping a spectral bandwidth in order to distinguish effectively wavelength division multiplexed (WDMed) and time division multiplexed (TDMed) optical components on a single optical waveguide.

For some embodiments, this fast sweeping may include introducing a pulse of light into an optical waveguide (e.g., an optical fiber) to interrogate sets of optical elements (e.g., fiber Bragg gratings (FBGs)) by performing a sweep of wavelengths completed in a shorter time than for the light to reach the closest optical element and be reflected back to a receiver. For some embodiments, once the sweep is completed, the light source may be turned off or idled at a wavelength that will not produce reflections from the optical elements (i.e., a wavelength that does not correspond to any characteristic wavelength of any optical element), until another swept pulse of light is desired. The pulses of light may be introduced into the optical waveguide at a rate that ensures that reflections from different light pulses do not overlap when these reflections return to the receiver.

Each optical element in a set may have a different characteristic wavelength, and each set may have an optical element with the same characteristic wavelength as an optical element in another set. Each set of optical elements may be located outside the sweep window of another set (i.e., the sweep windows do not overlap). As used herein, a sweep window generally refers to the time (or corresponding distance) over which all of the sensor signal reflections from a single set of (effectively wavelength division multiplexed) sensors are spread when travelling back to the receiver. Thus, the optical sensors in each set may be effectively multiplexed on the fiber using WDM (based on the wavelength sweep and the different characteristic wavelengths within the set), and the sets of optical sensors may be multiplexed using TDM (based on the timing of the received signals reflected from the optical elements).

Different embodiments of the present invention may utilize a fast wavelength sweep for distinguishing among signals received from multiple optical elements on a single fiber multiplexed using TDM and WDM as described herein in systems utilizing transmissive or reflective type sensors. Further, embodiments of the present invention may be applied in a number of different sensing applications, including, but not limited to, industrial applications, downhole applications (e.g., in wellbore sensing applications), and subsea applications (e.g., ocean bottom seismic sensing applications).

An Example Optical Sensor System

Figure 1A:
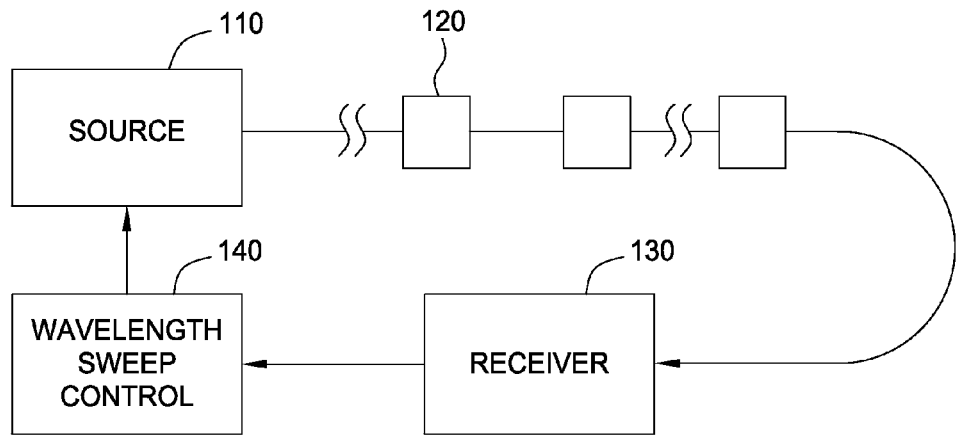
FIG. 1A illustrates an example transmissive optical sensor system with wavelength sweep control, in accordance with embodiments of the present invention.

FIG. 1A illustrates an example optical sensor system 100 utilizing wavelength sweep control in accordance with one embodiment of the present invention. As illustrated, the system 100 may include a swept-wavelength optical source 110, one or more transmissive optical elements 120 having one or more spectral features of interest (e.g., a characteristic wavelength), and a sweep control unit 140.

The swept-wavelength optical source 110 produces optical radiation at wavelengths and over wavelength ranges (bandwidths) under the control or influence of the sweep control unit 140. The elements 120 may be interrogated with optical radiation from the optical source 110 that is swept across a spectral range including the spectral features of interest. The elements 120 may be sensitive to parameters (e.g., temperatures, pressures, and strain) that affect the attenuation of particular wavelengths of light transmitted through the elements 120 in a known manner.

Figure 1B:
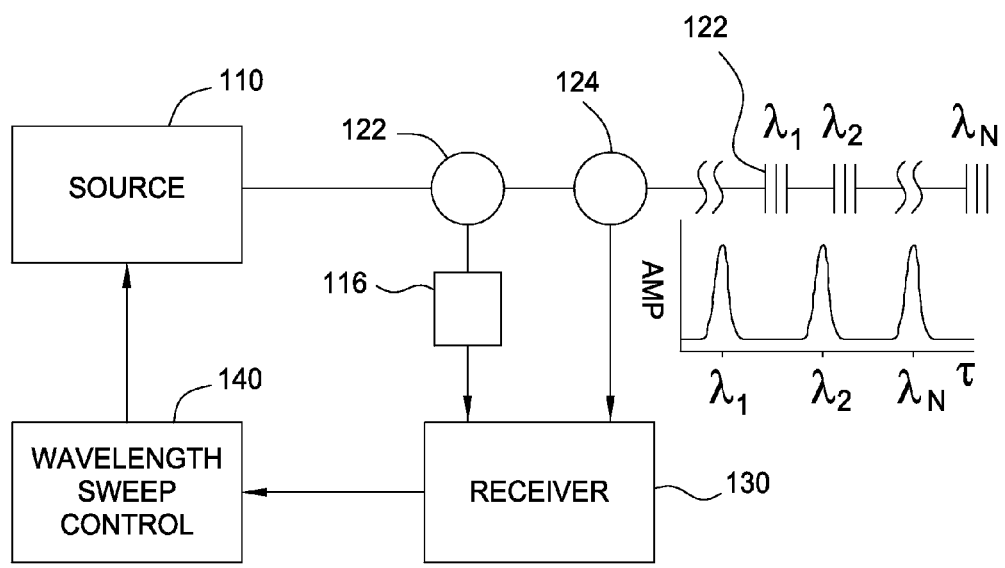
FIG. 1B illustrates an example reflective optical sensor system with wavelength sweep control, in accordance with embodiments of the present invention.

As illustrated in FIG. 1B, one embodiment of the optical source 110 may include a broadband source 112 and a tunable filter 114 that may be controlled by the sweep control unit 140. For example, the sweep control unit 140 may control the tunable filter 114 to adjust a wavelength range (or band) to pass with little or no attenuation while blocking wavelengths outside the range. For other embodiments, the optical source 110 may include a light source that can be controlled to generate optical signals of different wavelengths, such as a tunable laser. For some embodiments, a reference element 116 may be used to measure the wavelength versus the time of the sweep. The wavelength-versus-time measurement may be used to correlate return signal times of light reflected from the optical elements 122 with wavelengths in order to determine a value of a sensed parameter. For example, reference element 116 may be a Fabry-Perot etalon, a gas absorption cell, etc.

Referring back to FIG. 1A, a receiver 130 may include any suitable combination of optical, opto-electronic, and electronic components to process light signals transmitted through the elements 120. Thus, the receiver 130 may be able to generate information about the corresponding parameters, based on the timing of the received light signals and any shifts therein. The receiver 130 may include any suitable combination of components that converts optical signals to electrical signals, filters, and samples. As an example, for one embodiment, the receiver may include an optical PIN diode (i.e., having a lightly doped near intrinsic semiconductor region between a p-type semiconductor region and an n-type semiconductor region), transimpedance amplifier, analog filter, analog-to-digital converter, digital filter, and processing unit (e.g., an embedded processor, industrial or personal computer) for wavelength determination.

As illustrated, the sweep control unit 140 may receive, as input, one or more signals from one or more points in the receiver 130 and, in response, may output signals that influence the sweep of the optical source 110. Examples of typical parameters that the sweep control unit may influence include, but are not limited to, source wavelength, source wavelength sweep range, sweep rate, and/or source optical output power. These influences may include discontinuous or continuous changes in such parameters, for example, multiple sweep bands. The sweep control unit signals can influence a sweep in progress and/or influence future sweeps, as described in greater detail below.

The sweep control unit 140 may be implemented using any suitable processing logic, such as an embedded controller, a programmable logic controller (PLC) or personal computer (PC). While shown as a separate component in the Figures, for some embodiments, the sweep control unit 140 may be integrated into, or be an integral function of the receiver 130, the source 110, and/or both.

Figure 2:
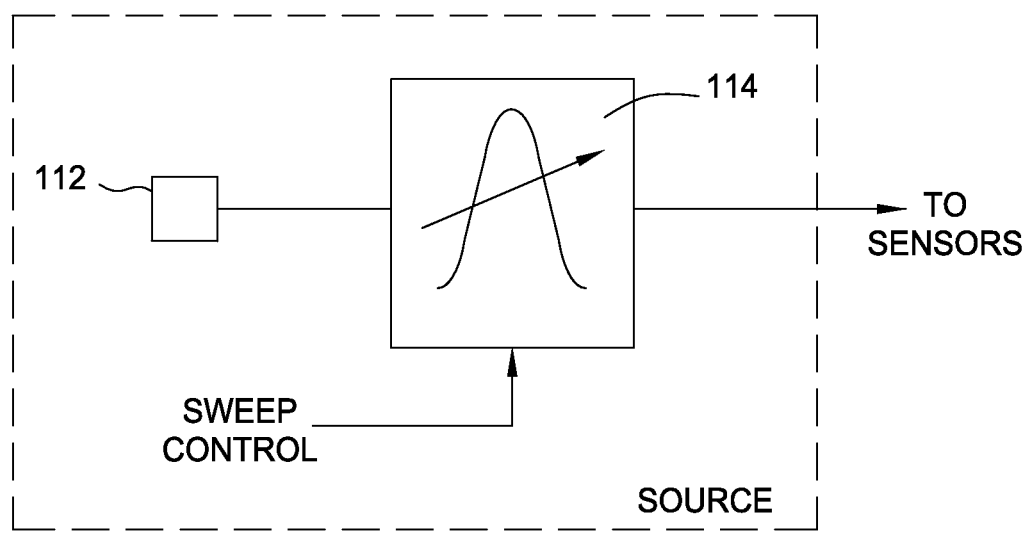
FIG. 2 illustrates an example wavelength sweeping optical source utilizing a tunable filter, in accordance with embodiments of the present invention.

As illustrated in FIG. 2, similar techniques may be applied to a system utilizing reflective sensor elements 122, such as Bragg gratings, with the spectral feature of the light reflected dependent upon a sensed parameter. Each Bragg grating 122 may be interrogated by sweeping across a corresponding wavelength range chosen to contain the characteristic wavelength λ, accounting for the maximum deviations in center wavelengths (areas of peak reflection) expected over the entire range of measured parameters and over time. During this interrogation, response signals are monitored by the receiver 130 in order to determine the time of the response signals, which may be used to determine the characteristic wavelength of the sensor element and, thus, the value of the sensed parameter.

Interrogating optical signals from the source 110 may be directed to the gratings 122 via a bidirectional coupler 124 that also directs reflected response signals to the receiver 130. A splitter 122 may also direct a portion of the interrogating optical signals to a reference element 116, allowing the receiver 130 to monitor optical signals produced by the optical source 120 (e.g., the actual wavelength and power).

As previously described, wavelength division multiplexing (WDM) systems, such as the system 200 typically are limited in the number of sensors that can be interrogated on a single fiber. However, embodiments of the present invention may increase the number of sensors than can be combined on the fiber by using a fast-sweep tunable optical source, thereby allowing distinguishing among signals from the sensors based on the timing of the received signals and the sweep, thereby effectively providing for both WDM and TDM on the fiber.

Example Fast Swept Interrogation

Figure 3:
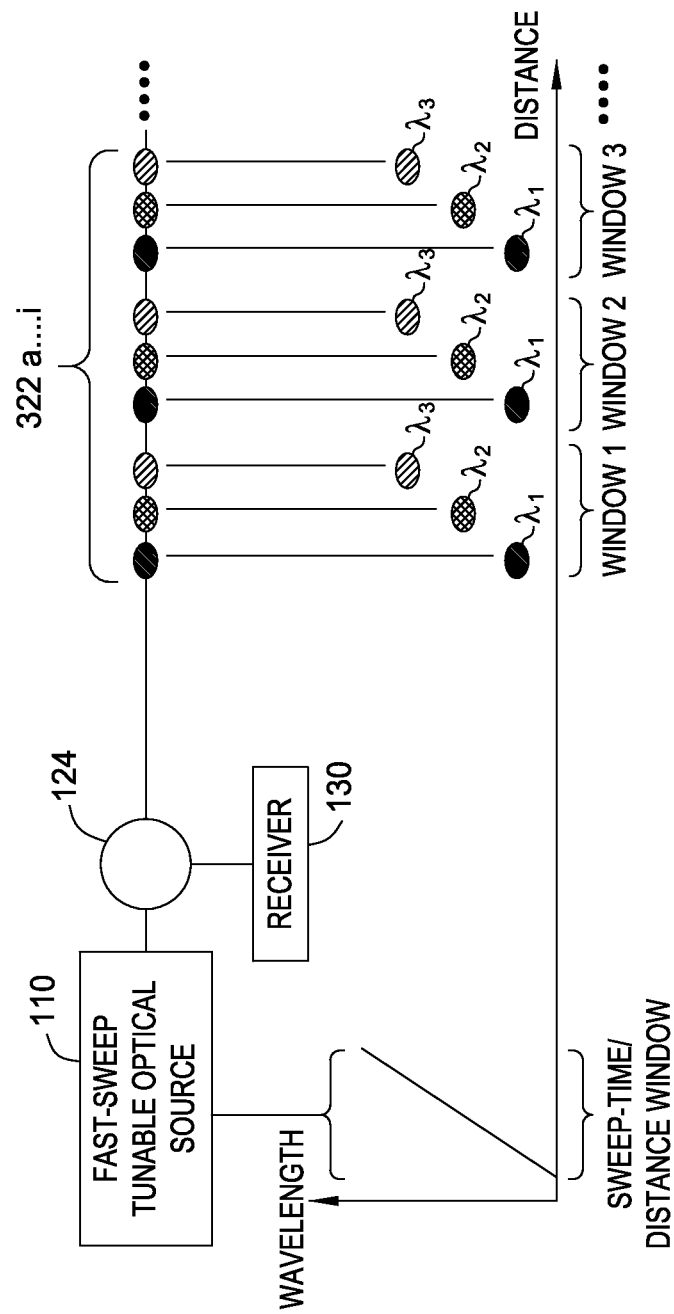
FIG. 3 illustrates example interrogation of time division multiplexed (TDMed) and effectively wavelength division multiplexed (WDMed) sensors on a single fiber using a fast-swept optical source, in accordance with embodiments of the present invention.

FIG. 3 illustrates example interrogation of time division multiplexed (TDMed) and effectively wavelength division multiplexed (WDMed) sensors on a single fiber using a fast-swept tunable optical source, in accordance with embodiments of the present invention. As illustrated in FIG. 3, a tunable optical source, such as source 110 (e.g., a tunable laser or amplified spontaneous emission (ASE) source with a tunable filter) may be coupled to an optical waveguide 302 (e.g., an optical fiber) containing multiple optical elements (e.g., fiber Bragg grating (FBG) sensors) 322a . . . i to be interrogated by the optical source 110. The optical elements 322a . . . i may have characteristic wavelengths within the output wavelength capabilities of the optical source 110. An optical coupler, such as optical coupler 124, may route light reflected by the optical elements 322 to a receiver, such as receiver 130.

The receiver 130, or a separate processing unit, may be configured to process (e.g., demodulate) received signals from the optical elements 322a . . . i based on the times at which the signals are received, the sweep rate of source 110, and the relative distances of the optical elements 322a . . . i from the optical source 110 and the receiver 130 (i.e., time-of-flight). The receiver 130 may convert the optical signals to electrical signals for further processing. The tunable optical source 110 may have a fast sweep rate such that a sweep of the optical spectrum is completed in only a fraction of the time that it takes the light to travel down the optical waveguide 302 to the furthest optical element in the system, for example optical element 322i shown in FIG. 3, and be reflected back to the receiver 130 (i.e., the round-trip time). For some embodiments, this sweep is accomplished in a period less than a round-trip time to the closest optical element along the waveguide. After completing a sweep of the desired optical spectrum, the optical source 110 may be turned off or idled by outputting a wavelength which will not be reflected by any of the optical elements 322. In some embodiments, the optical source 110 may emit a chirped pulse of light.

The sweep time of the optical source 110 is used to define a sweep window within which multiple optical elements 322 can be multiplexed using WDM, so to speak. The optical elements within each set are effectively WDMed by having different characteristic wavelengths that reflect light at different times according to their individual distance along the fiber and the parameters of the wavelength sweep function (e.g., the sweep rate). The sweep time of the optical source 110, along with the wavelength direction of the sweep (e.g., short wavelengths to long wavelengths or long wavelengths to short wavelengths), the distance to and spacing of the optical elements in the WDMed set, and the ordering of the characteristic wavelengths of the optical elements in the set define a time/distance window of the light received from (e.g., reflected by) the optical elements in the set. For example, the time at which light may be received from an optical element within the set may correspond to a distance of the optical element from the optical source, as well as the characteristic wavelength of the optical element and when that wavelength occurs during the sweep (which may depend on the direction of the sweep). Therefore, a window may be defined for each set that includes the spread, in time or distance, of the light signals received from the optical elements within the set.

Therefore, in order for optical elements 322 to be multiplexed on the optical waveguide 302 using WDM, the optical elements may have different characteristic wavelengths. For example, as illustrated in FIG. 3, optical elements 322a, 322b, and 322c may be located within the sweep window and have characteristic wavelengths $\lambda\_1$, $\lambda\_2$, and $\lambda\_3$, where $\lambda\_1$, $\lambda\_2$, and $\lambda\_3$ are each different wavelengths. In this case, optical elements 322a, 322b, and 322c may be effectively WDMed on the optical waveguide 302. The receiver 130 may distinguish among signals received from the optical elements 322a, 322b, and 322c based on the time at which the signals are received, which is a function of the sweep parameters.

Additional optical elements can be multiplexed using TDM as long as they are outside the sweep windows of other sensors with the same characteristic wavelengths. For example, as illustrated in FIG. 3, optical elements 322d, 322e, and 322f may be located outside the sweep window of optical elements 322a, 322b, and 322c. Optical elements 322d, 322e, and 322f may therefore have characteristic wavelengths $\lambda\_1$, $\lambda\_2$, and $\lambda\_3$, and the optical sensors may be TDMed to distinguish therebetween. Similarly, optical elements 322g, 322h, and 322i may be outside the sweep windows of optical elements 322a, 322b, 322c, 322d, 322e, and 322f. Optical elements 322g, 322h, and 322i may therefore also have characteristic wavelengths $\lambda\_1$, $\lambda\_2$, and $\lambda\_3$, and the optical sensors may be TDMed to distinguish therebetween. In certain embodiments, optical elements 322d-322i may have characteristic wavelengths different than the first set of optical elements (e.g., $\lambda\_4$-$\lambda\_9$).

In certain embodiments, the optical elements may be in arranged in order of increasing or decreasing order of characteristic wavelength. In some embodiments, the optical elements may be arranged in any order of characteristic wavelengths (e.g., randomly). In certain embodiments, optical elements of the second set may be arranged in the same order or the reverse order of characteristic wavelengths of the optical elements in the first set. In certain embodiments, optical elements of the second set may be arranged in any order of characteristic wavelengths (e.g., randomly).

In some embodiments, the sweep rate may be about 400 kHz, corresponding to a 2.5 μs sweep time and sweep distance of 500 m in an optical fiber. In some embodiments, the sweep rate may be about 1 MHz or higher. The resolution of the sweep or sweep time may be dependent on the sample rate of the receiver 130. For example, for a 1 MHz sweep rate, a receiver may sample with a 13-bit data acquisition card.

Using the above-described approaches, multiple sets of optical elements can be multiplexed on the fiber, greatly increasing the number of sensors in the sensing system that can be distinguished. If the wavelength sweep range is reduced to cover the operational wavelength range of just one optical element, then the system may become a TDM-only system.

Figure 4:
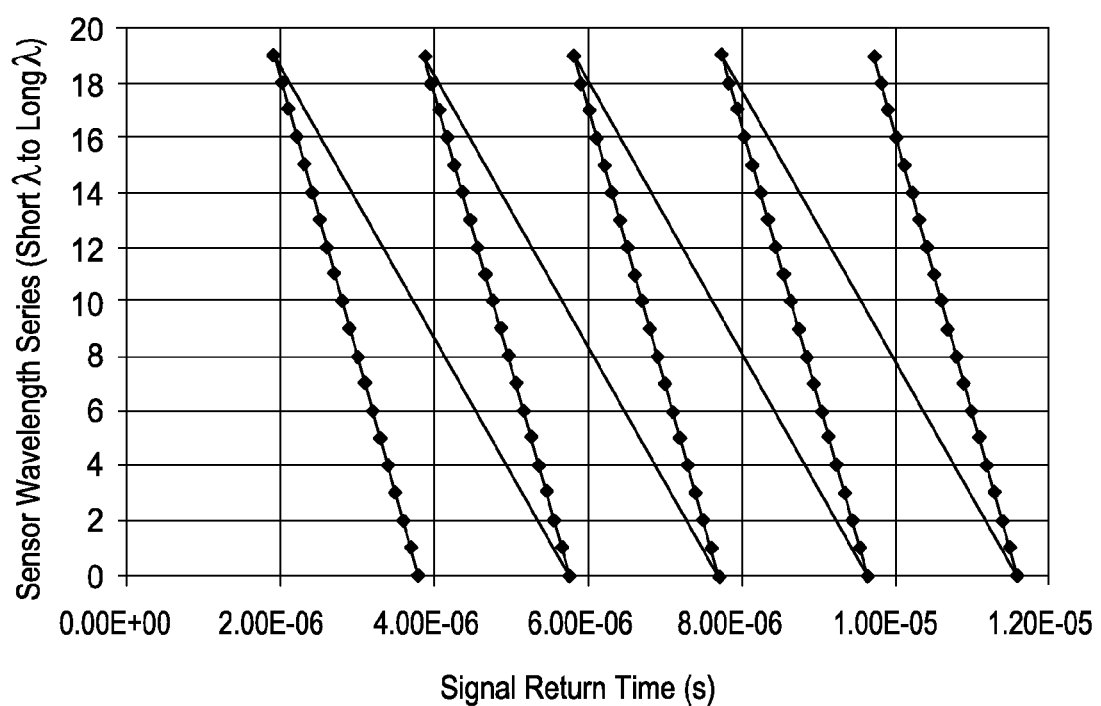
FIG. 4 illustrates example return signals reflected from an array of sensors disposed in increasing wavelength order, interrogated with a sweep of decreasing wavelength, in accordance with embodiments of the present invention.

FIG. 4 illustrates example return signals reflected from an array of sensors disposed in increasing wavelength order, interrogated with a sweep of decreasing wavelength, in accordance with embodiments of the present invention. As illustrated in FIG. 4, a 100-point sensor array with 10 m spacing may be used. The sensors may each have one of, for example, 20 different characteristic wavelengths and may be disposed along the optical waveguide in repeated sets in increasing wavelength order (e.g., short wavelength to long wavelength). The 100-point sensor array may be interrogated, for example, with a 3.9 μs sweep from long wavelength to short wavelength. This arrangement may allow the slowest possible wavelength sweep for the given density of sensors and number of available wavelengths.

In order to obtain accurate sensor parameter measurements, knowing the exact time-of-flight of the interrogating light, to and from each sensor, may be desirable because uncertainties in the time-of-flight to the sensor may result in uncertainties in the conversion of the received signal time to the characteristic wavelength of the sensor and, thus, the value of the sensed parameter. One approach to determine the exact time-of-flight is described in more detail below in the section entitled "Example Time Delay Compensation" and in co-pending U.S. patent application Ser. No. 14/076,766 to Taverner et al., filed Nov. 11, 2013 and entitled "Time Delay Compensation for Optical Waveguides Using a Bidirectional Wavelength Scan," which is herein incorporated by reference in its entirety. The approach includes performing an optical sweep in a first wavelength direction (e.g., short wavelength to long wavelength), performing another sweep in the opposite wavelength direction (e.g., long wavelength to short wavelength) and comparing the relative shifts of each peak in the two sweeps to calculate the time-of-flight for each optical sensor.

Figure 5:
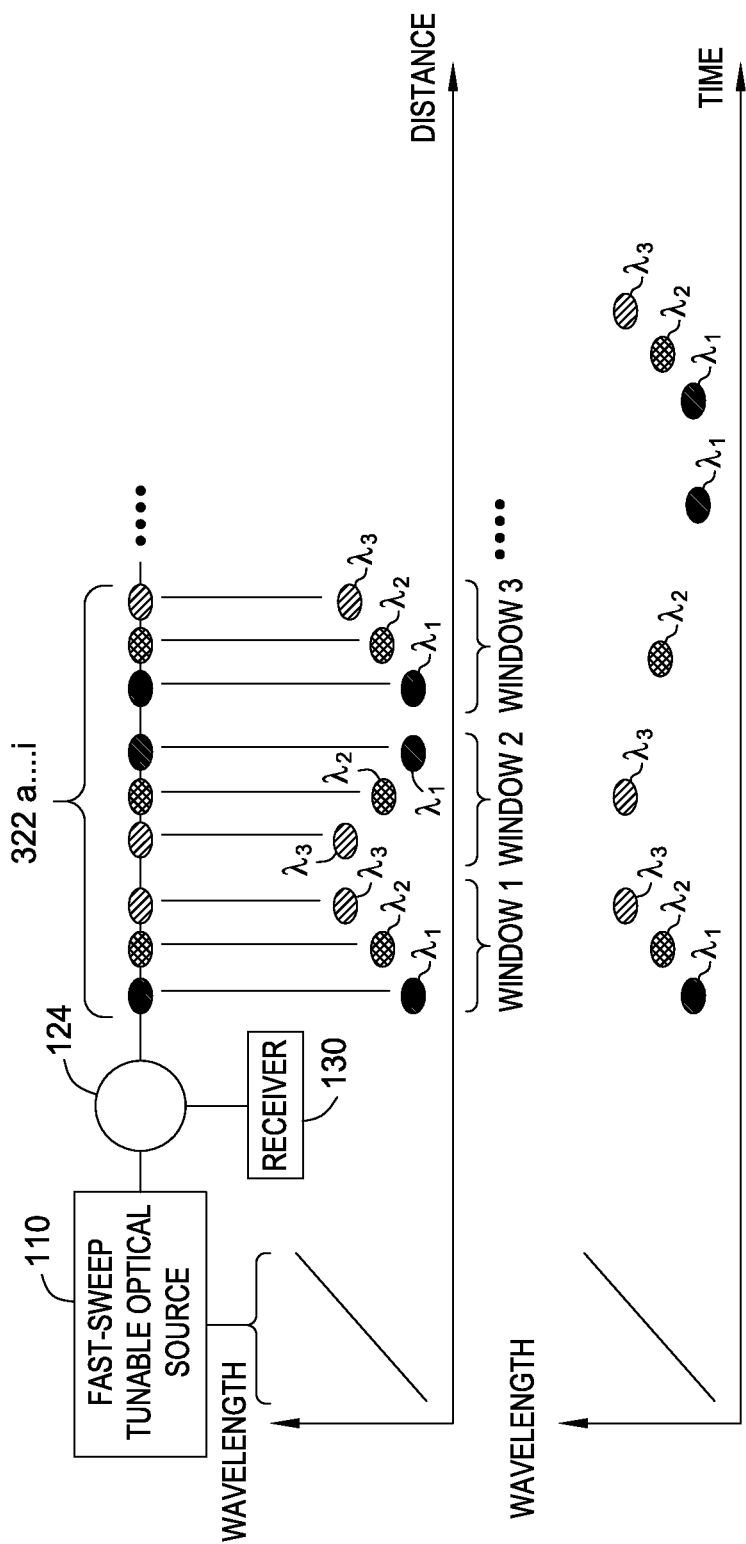
FIG. 5 illustrates example alternating sensor characteristic wavelength order over three adjacent sets of sensors and timing of the respective return signals at the receiver over three adjacent sweep windows, in accordance with embodiments of the present invention.

In order to facilitate the alternating sweep direction technique, the optical elements may be arranged in the opposite wavelength order in adjacent sweep windows; otherwise certain signals received from the optical elements in adjacent windows may coincide at the receiver, preventing separate measurement of the optical elements. FIG. 5 illustrates example sensor characteristic wavelength order along a waveguide and timing of the respective optical signals at the receiver over three adjacent sweep windows, in accordance with embodiments of the present invention. As illustrated in FIG. 5, optical sensors 322a, 322b, and 322c may have characteristic wavelengths $\lambda\_1$, $\lambda\_2$, and $\lambda\_3$, respectively. Optical sensors 322d, 322e, and 322f may then have characteristic wavelengths $\lambda\_3$, $\lambda\_2$, and $\lambda\_1$, respectively, and optical sensors 322g, 322h, and 322i may have characteristic wavelengths $\lambda\_1$, $\lambda\_2$, and $\lambda\_3$, respectively. As shown in FIG. 5, the optical elements may (although need not) be spaced in equal incremental distances along the optical waveguide. However, because of the sweep order and the alternating order of characteristic wavelengths, the light may not be reflected by (or otherwise received from) the optical sensors at equal incremental times.

Figure 6:
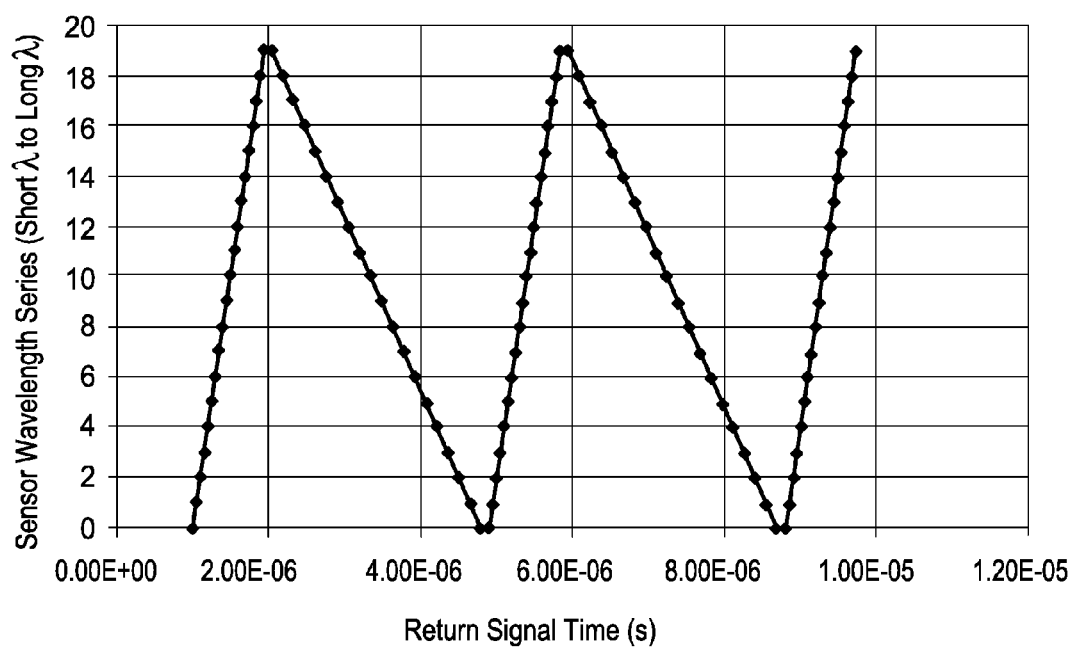
FIG. 6 illustrates example return signals reflected from an array of sensors disposed in alternating wavelength order, in accordance with embodiments of the present invention.

FIG. 6 illustrates example return signals reflected from an array of sensors disposed in alternating wavelength order, in accordance with embodiments of the present invention. As illustrated in FIG. 6, in order to implement the alternating sweep direction technique, the sensors may be arranged in the opposite wavelength order in adjacent sets of sensors. Otherwise, certain return signals from sensors in adjacent windows may coincide at the detector and prevent separate measurement of the sensors, unless a faster sweep (i.e., a shorter sweep time) is used.

As shown in FIG. 6, a 100-point sensor array with 10 m spacing may be used. 20 wavelengths organized in repeated sets of sensors placed in alternating wavelength order (e.g., short wavelength to long wavelength followed by long wavelength to short wavelength) in the fiber may be used. The sensors may be interrogated with a 0.95 μs sweep from long wavelength to short wavelength. This arrangement may allow the use of sweeps in either wavelength order or alternated in an effort to calculate the time-of-flight to each sensor.

Figure 7:
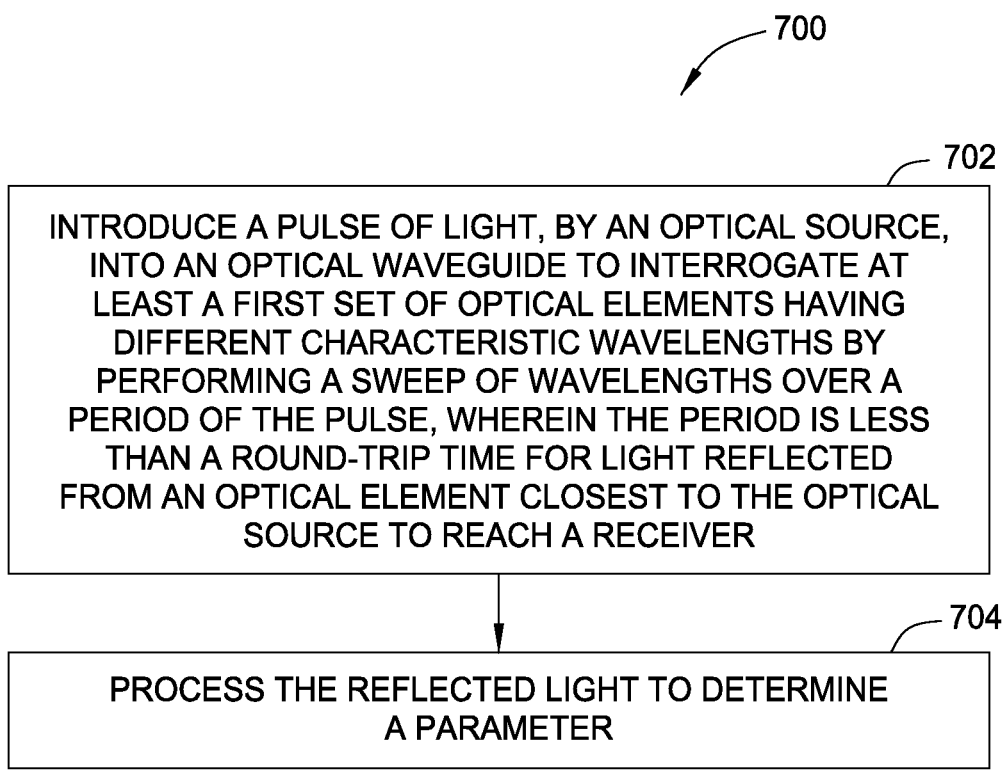
FIG. 7 is a flow diagram of example operations for interrogating optical elements having characteristic wavelengths spanning a sweep range, in accordance with embodiments of the present invention.

FIG. 7 is a flow diagram of example operations 700 for fast wavelength sweeping in order to distinguish among multiple optical elements on a single optical waveguide. The operations 700 may be performed, for example, by the wavelength sweep control unit 140, the optical source 110, and/or the receiver 130. At step 702, a sweep begins, for example, with an optical source introducing a pulse of light into an optical waveguide to interrogate at least a first set of optical elements having different characteristic wavelengths by performing a sweep of wavelengths over a period, wherein the period is less than a round-trip time for light reflected from an optical element closest to the optical source to reach a receiver. As described above, the period of the sweep may be only a fraction of the round-trip time to the furthest optical element.

At step 704, the reflected light is processed to determine a parameter. For example, a light signal reflected from a particular optical sensor (known according to the time of reception) is processed to determine a parameter (e.g., temperature or pressure) for the location corresponding to that sensor, based on the reference time-of-flight, any time deviation therefrom, and the wavelength versus time of the wavelength sweep by the optical source 110. As described above, the period of the sweep and the location and characteristic wavelengths of the optical elements may define a sweep window corresponding to a time over which light reflected from the first set of optical elements is spread. In this manner, the first set of optical elements may be effectively WDMed on the optical waveguide. A second set of optical elements may be further TDMed on the optical waveguide if optical elements of the second set are located outside the sweep window of any optical element of the first set of optical elements having the same characteristic wavelength.

Example Time Delay Compensation

As described above in FIGS. 1B and 2, certain interrogation techniques use wavelengths sweeps, i.e., a wavelength sweep generated using, for example, a tunable laser or a broadband light source together with an optical tunable filter, to interrogate optical sensors (e.g., reflective sensor elements 122). For example, a wavelength sweep may sweep from shorter wavelengths to longer wavelengths, or vice versa, from longer wavelengths to shorter wavelengths. For certain embodiments, the wavelengths may also be varied in a non-linear manner (e.g., sinusoidal). Additionally, different sweep rates may be used at which the wavelength sweep is performed.

As the wavelength sweep is performed, a receiver unit (e.g., receiver 130) may detect reflected optical power from the reflective sensor elements 122 (e.g., FBGs). For example, the receiver 130 may detect reflective peaks corresponding to characteristic wavelengths of FBGs.

At the receiver 130, the receiving signal will have traveled a round trip distance of L1+L2, where L1 is the distance from the optical source 110 to the reflective sensor element 122 from which the received signal was reflected (e.g., in meters), and where L2 is the distance from the sensor element 122 from the which the received signal was reflected to the receiver 130 (e.g., in meters). Therefore, if the refractive index of the optical waveguide is n, the round-trip time for the reflected light to reach the receiver 130 is:

$$t = \frac{(L1 + L2)n}{c}$$

where c is the speed of light in a vacuum (roughly $3 \times 10^8$ m/s). This round-trip time is the time the receiver 130 can expect to receive the reflected optical signal from the interrogation of a particular reflective sensor element 122.

For long waveguide lengths (e.g., hundreds of meters or several kilometers of optical fiber), the difference between L1 and L2 may be negligible, such that the round-trip time for a signal from the optical source to a particular optical element and back to the receiver, may be rewritten as $$t = 2Ln/c$$

where L is the length from the optical source to the optical element from which the received signal was reflected (e.g., the length of the optical fiber for the particular optical element).

When performing a wavelength sweep to interrogate a plurality of optical elements, the detected wavelength returned from an optical element is always delayed due to this finite round-trip time and may not equal the current scanning wavelength being output (e.g., by the optical source 110) at the time the detected wavelength is received. In other words, there may be a lag between outputting a particular wavelength and receiving reflections at that same wavelength, such that by the time the reflections are received, the optical source may be transmitting light at a different wavelength. Equal to the round-trip time, this lag may be referred to as a time delay ($\Delta t$), such that the detected wavelength returned from an optical element is always delayed by $\Delta t$ relative to the current wavelength according to the sweep (i.e., the wavelength currently being output by the optical source 110).

The time delay ($\Delta t = 2Ln/c$) may result in a corresponding wavelength shift ($\Delta\lambda$), as shown in the following equation:

$$\Delta\lambda = v\Delta t$$

where v is a velocity of the wavelength scan (e.g., in m/s). The velocity (v) may be positive or negative depending on the direction of the wavelength sweep. As can be seen from the equations above, for large v (i.e., fast sweep speeds) or large L (i.e., long fibers with correspondingly large $\Delta t$), the impact on the measured wavelength, if not properly compensated, causes significant error in the form of wavelength shift.

The speed of the wavelength sweep, the speed of light, and the index of refraction may all be known. However, for long waveguides, the length (L) may be difficult to accurately measure. Therefore, it may be challenging to determine whether measured changes in wavelength ($\lambda$) are a result of shifts in the characteristic wavelength due to changes in the sensed parameter or to shifts in the measured wavelength due to the time delay ($\Delta t$).

In order to avoid the time delay issue, low-speed wavelength sweeps and/or short length waveguides may be used, such that the time delay is small enough that it does not cause a significant wavelength shift and may be either neglected or a rough estimation of waveguide length and index of refraction may be used to determine a compensation value. However, using low-speed wavelength sweeps and/or short length waveguides may be undesirable for certain applications. For example, for faster data updating rate or better measurement resolution, faster wavelength sweep speed may be preferred. Longer waveguide ranges may be desirable in certain applications. In cases where long optical waveguides are used, it may not be practical to obtain waveguide length accurately enough for the time delay compensation.

Therefore, in order to accurately determine the measured characteristic wavelength in cases of fast sweep and/or long waveguide lengths, for example, the time delay ($\Delta t$) (and corresponding wavelength shift Δλ) may be compensated for by using a bidirectional wavelength sweep.

Figure 8:
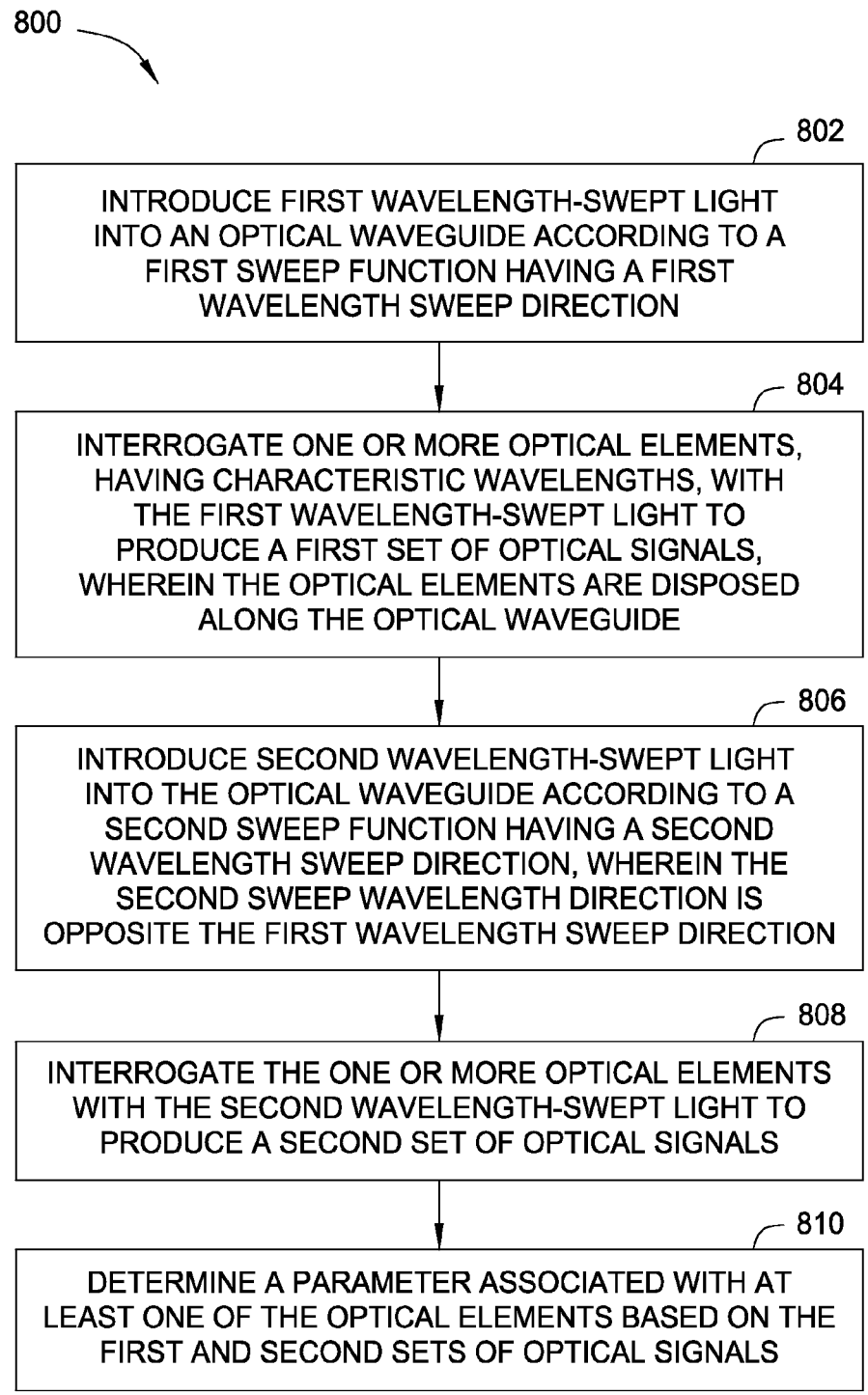
FIG. 8 is a flow diagram of example operations for performing a two-way wavelength sweep to determine a parameter, in accordance with embodiments of the present invention.

FIG. 8 is a flow diagram of example operations 800 for performing a two-way wavelength sweep to determine a parameter, in accordance with embodiments of the present invention.

The operations 800 may begin, at 802, by introducing first wavelength-swept light into an optical waveguide, according to a first sweep function having a first wavelength sweep direction. In some embodiments, the light may be introduced by an optical source which may be, for example, a tunable light source or a broadband light source together with a tunable filter. The optical waveguide may be an optical fiber, or example.

At 804, one or more optical elements having identifiable spectral features (e.g., characteristic wavelengths) may be interrogated with the first wavelength-swept light to produce a first set of optical signals. The optical elements are disposed along the optical waveguide. The optical elements may be disposed at equal or varying distances from one another. Spacing between the optical elements may vary from centimeters to several kilometers (e.g., greater than 10 km). For example, the optical elements may be Bragg gratings, such as fiber Bragg gratings (FBGs), which reflect light at the characteristic wavelengths. In addition or as an alternative to Bragg gratings, the optical elements may include any suitable optical sensors or other optical components having identifiable spectral features, such as Fabry-Perot structures, long period gratings (LPGs), side-hole cane waveguide sensors (e.g., as described in U.S. Pat. No. 8,494,322 to Kersey et al. and available from Weatherford/Lamb, Inc. of Houston, Tex.), and the like.

At 806, second wavelength-swept light may be introduced into the optical waveguide according to a second sweep function having a second wavelength sweep direction. The second wavelength sweep direction is opposite the first wavelength sweep direction. For example, the second sweep function may sweep in increasing wavelength order, while the first sweep function may sweep in decreasing wavelength order.

At 808, the one or more optical elements may be interrogated with the second wavelength-swept light to produce a second set of optical signals. The first and second sets of optical signals may include amplitude peaks at times corresponding to reflections from the optical elements at the characteristic wavelengths.

At 810, a parameter associated with at least one of the optical elements may be determined based on the first and second sets of optical signals. The two sweeps may be performed fast enough such that the time delay (Δt) of the reflected optical power is the same in both sets of optical signals since the waveguide length L may most likely not change in the time between the two sweeps. Because the sweeps are performed in opposite directions, the time delay results in a shift to a higher wavelength in one direction and to a lower wavelength in the opposite direction—although the amount by which the wavelength is shifted is the same (assuming the sweep rate is the same in both directions). The sweep may also be performed fast enough that the sensed parameter—and also therefore, the characteristic wavelength of each optical element—does not change between the first and second sweeps.

The parameter may be a sensed parameter of the downhole environment (e.g., pressure or temperature) to which the optical elements are sensitive. In the case of FBGs, for example, the characteristic wavelengths (i.e., the wavelengths at which light is reflected back from the FBGs) may shift with a change in temperature or pressure. As such, the sensed parameter may be monitored by monitoring changes in the wavelengths of signals reflected by the optical elements—which may be determined by times at which signals are detected.

Using the two-way sweep, the time delay of the received signals may be determined for each optical element using the pair of optical signals in each direction reflected by that optical element. The following formulation of two equations with two unknowns may be used for each optical element:

$$\lambda = f(t\_up, \Delta t)$$

$$\lambda = g(t\_down, \Delta t)$$

where t_up is the time at which light from the first sweep (e.g., the upscan from shorter to longer wavelengths) reflected from the optical element is received, t_down is the time at which light from the second sweep (e.g., the down scan from longer to shorter wavelengths) reflected from the same optical element is received, Δt is the unknown time delay introduced by the finite time the light travels in the waveguide, λ is the unknown characteristic wavelength of the optical element, f( ) is the wavelength demodulation algorithm for the first sweep, and g( ) is the wavelength demodulation algorithm for the second sweep.

According to some embodiments, determining the parameter at 810 may involve identifying a first time at which a first optical signal in the first set of optical signals from one of the optical elements is detected; identifying a second time at which a second optical signal in the second set of optical signals from the one of the optical elements is detected; calculating at least one of a time delay or a wavelength (the time delay or the wavelength being associated with the one of the optical elements) based on the first and second times; and determining the parameter based on the calculated time delay or wavelength. For some embodiments, calculating the at least one of the time delay or the wavelength includes solving first and second equations, wherein in the first equation the wavelength equals a first wavelength function of the time delay and the first time (e.g., a difference between the first time and the time delay), and wherein in the second equation the wavelength equals a second wavelength function of the time delay and the second time (e.g., a difference between the second time and the time delay). For some embodiments, determining the parameter based on the calculated time delay or wavelength entails identifying the parameter based on the wavelength calculated from the first and second equations. At least one of the first and second wavelength functions may be a wavelength demodulation algorithm. For some embodiments, the time delay is attributable to the first or second wavelength-swept light traveling from an optical source via the optical waveguide, to the one of the optical elements, and back to an optical receiver.

According to some embodiments, the first sweep function and the second sweep function are performed at a sweep rate such that the parameter does not change significantly between performing the first sweep function and performing the second sweep function. For some embodiments, the first wavelength sweep direction proceeds from relatively shorter wavelengths to longer wavelengths, and the second wavelength sweep direction proceeds from the longer wavelengths to the shorter wavelengths. For other embodiments, the first wavelength sweep direction proceeds from relatively longer wavelengths to shorter wavelengths, and the second wavelength sweep direction proceeds from the shorter wavelengths to the longer wavelengths.

According to some embodiments, the first sweep function and the second sweep function have a constant sweep rate. For some embodiments, the first and second sweep functions are linear functions, whereas in other embodiments, the first and second sweep functions are nonlinear functions. For example, the first and second sweep functions may be sinusoidal functions.

According to some embodiments, the parameter determined at 810 may be the time delay or the characteristic wavelength of at least one of the optical elements. The time delay or the characteristic wavelength may be a useful quantity for certain applications.

Figure 9:
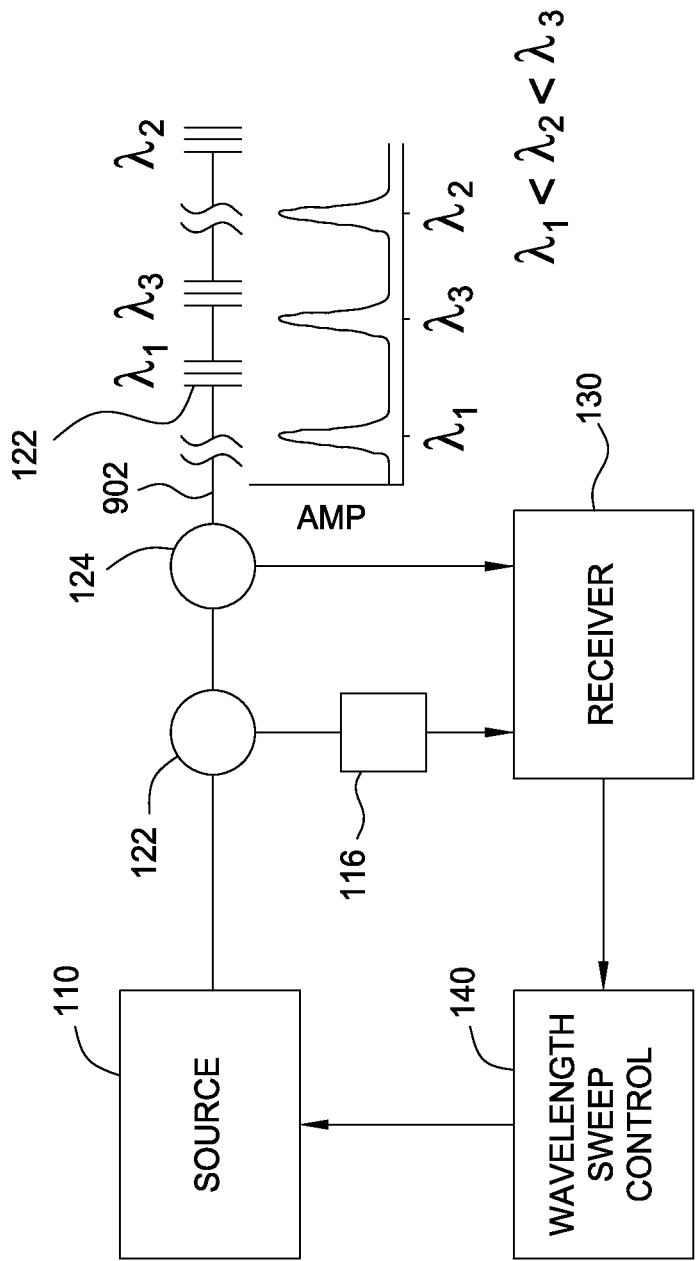
FIG. 9 is a block diagram illustrating an example interrogation system for performing a two-way wavelength sweep to determine a time delay, in accordance with embodiments of the present invention.

FIG. 9 is a block diagram illustrating the example interrogation system of FIG. 1B with an FBG 2, having a characteristic wavelength $\lambda\_2$ spaced at a relatively long distance on an optical fiber 902 from FBGs 1 and 3 (having characteristic wavelengths $\lambda\_1$ and $\lambda\_3$, respectively). Although FBGs are illustrated in the example system of FIG. 9, other suitable optical elements having identifiable spectral features may be used. As shown in FIG. 9, FBGs 1 and 3 may be located relatively close to one another on the fiber 902. However, FBG 2 may be located along the fiber 902 a relatively long distance from FBGs 1 and 3. For example, there may be 10 km of optical fiber between FBG 3 and FBG 2. In this case, the time delay introduced by light traveling 10 km to the FBG 2 and 10 km returning to the receiver 130 may create a significant error in the form of a wavelength shift ($\Delta\lambda$), as shown in FIG. 10.

Figure 10:
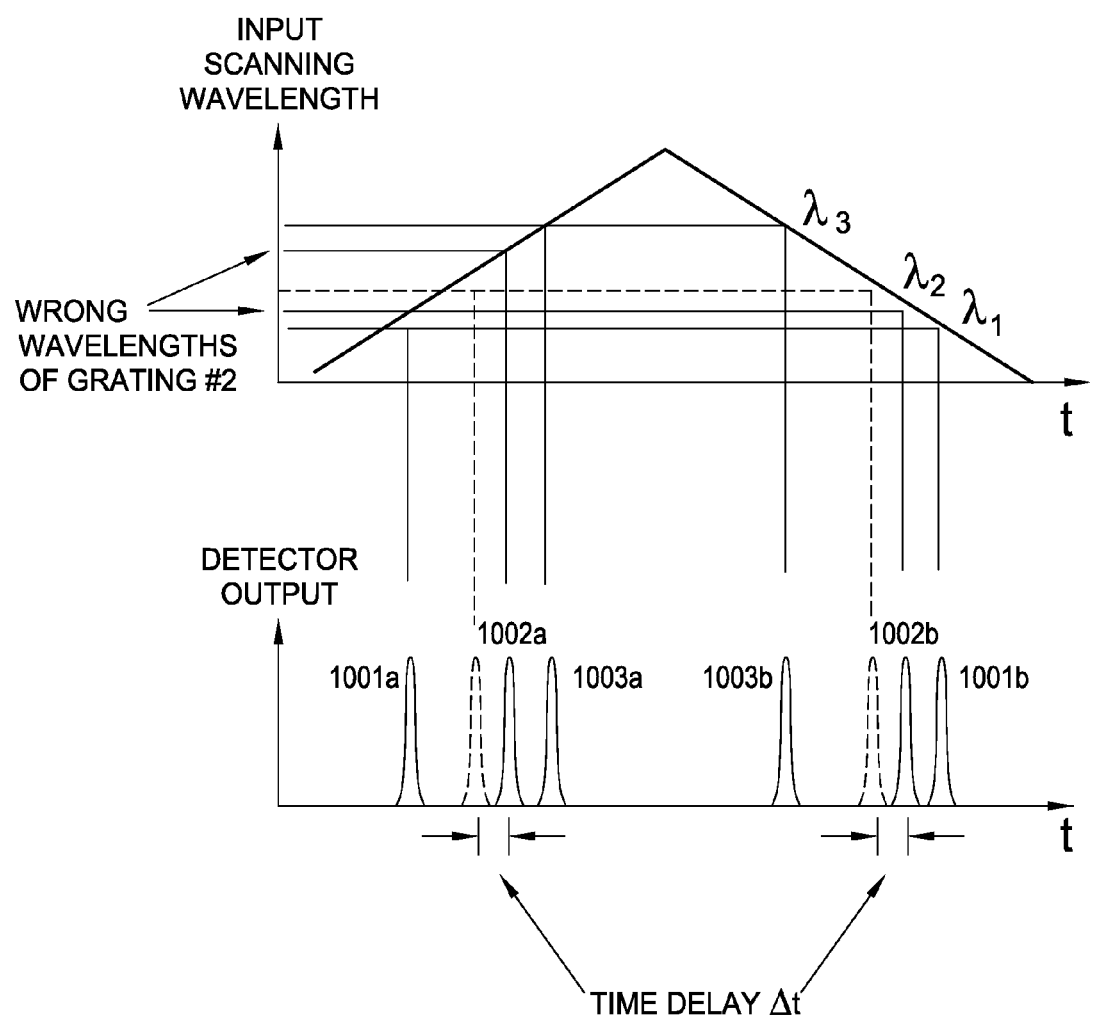
FIG. 10 illustrates a time delay in a received signal from a two-way wavelength sweep performed by an interrogation system, in accordance with embodiments of the present invention.

FIG. 10 illustrates a time delay in a received signal from a two-way wavelength sweep performed by an interrogation system, such as the interrogation system shown in FIG. 9, in accordance with embodiments of the present invention. As shown in FIG. 10, the dashed waveforms show the expected received signals relative to the wavelength sweeps. As shown, however, signal 1002a (received from FBG 2) experiences a time delay ($\Delta t$) relative to the dashed waveform due to travel in the fiber 902, corresponding to a wavelength shift ($\Delta\lambda$), closer to $\lambda\_1$ in a first sweep, but closer to $\lambda\_3$ in a second reverse sweep.

However, as also shown in FIG. 10, the time delay ($\Delta t$) should be the same in both sweep directions. Therefore, by performing the two-way wavelength sweep, a system of two equations may be set up accounting for $\Delta t$ to compensate the reception times of the received signals and accurately determine the wavelength. $\Delta t$ is a first unknown, and the wavelength of the received signal is a second unknown. Because the sweep may be performed fast enough such that the wavelength does not change between sweeps, the wavelength in the two equations may be equal, and the equations may therefore be solved to determine $\Delta t$ and $\lambda$.

Figure 11:
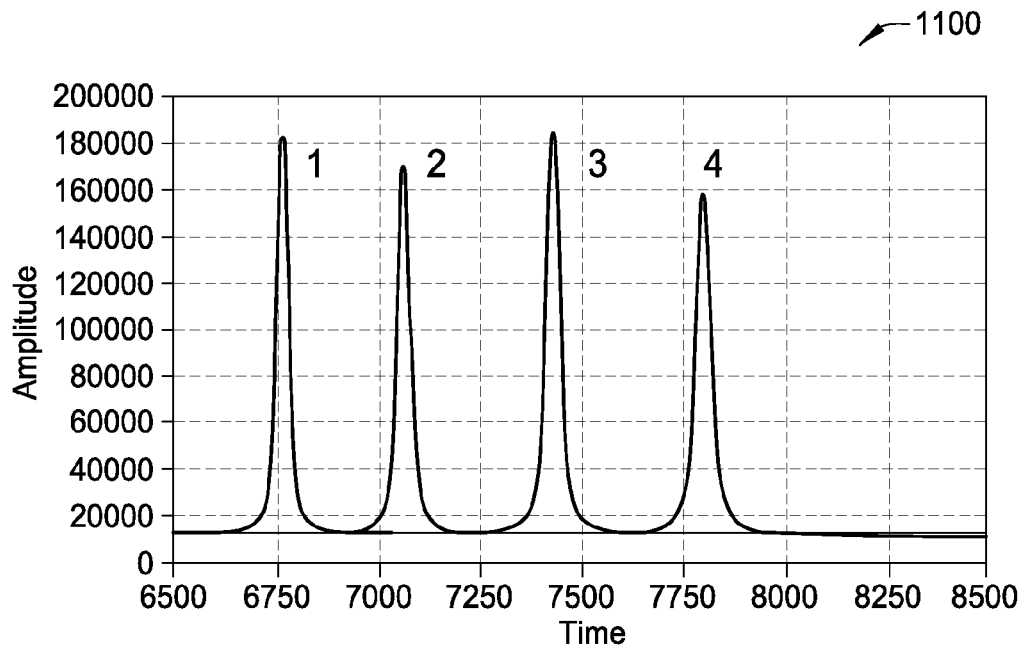
FIG. 11 illustrates an example received signal showing times at which reflected signals from a one-way sweep of four fiber Bragg gratings (FBGs) on a relatively short optical fiber are detected, in accordance with embodiments of the present invention.

FIG. 11 illustrates an example plot 1100 of a received signal showing times at which reflection peaks from a one-way sweep of four FBGs on a relatively short fiber (<<1 km) are detected, in accordance with embodiments of the present invention. In the example shown in FIG. 11, peaks of optical power are detected in a signal received from four FBGs 1, 2, 3, and 4, the FBGs being interrogated with a 100 Hz wavelength sweep and separated by about 80 nm peak-to-peak. The FBGs are located a relatively short distance (e.g., <1 km) from the source and receiver such that any time delay may be negligible. In the example shown in FIG. 11, the measured wavelength difference between FBGs 2 and 3 is 1.7934 nm.

Figure 12:
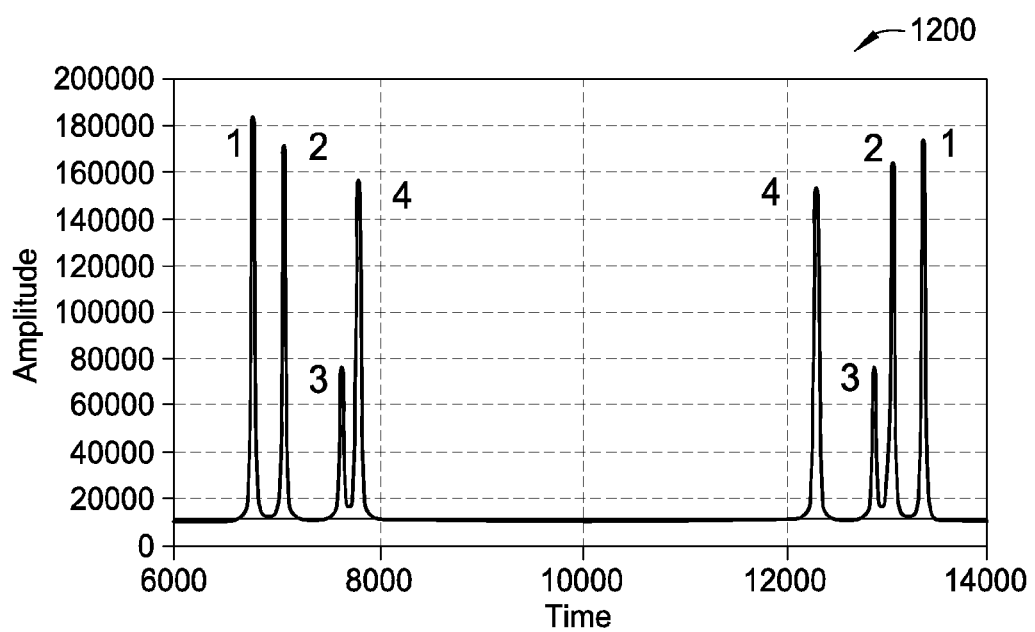
FIG. 12 illustrates an example received signal showing times at which reflected signals from a two-way sweep of four FBGs are detected with a relatively long fiber are detected, in accordance with embodiments of the present invention.

FIG. 12 illustrates an example plot 1200 of a received signal showing times at which reflection peaks from a two-way sweep of four FBGs are detected with a 10.2 km fiber for FBG 3, in accordance with embodiments of the present invention. In the example shown in FIG. 12, four FBGs 1, 2, 3, and 4 may be interrogated with a 100 Hz wavelength sweep and have characteristic wavelengths separated by about 80 nm peak-to-peak, the same as shown in FIG. 11. However, in the example shown in FIG. 12, FBG 3 may be located about 10.2 km from the other FBGs, thus introducing a time delay and corresponding wavelength shift in the light detected from FBG 3. As seen in FIG. 12, the reflected signal from FBG 3 is received with a time delay, closer to FBG 4 in the first sweep and closer to FBG 2 in the second sweep in the reverse direction. In this case, the measured wavelength difference is 1.7926 nm. Because a two-way sweep is performed, the time delay can be calculated as 99.374 µs, corresponding to a length of 10.146 km and refractive index of 1.4681 in a single-mode fiber.

Using a two-way direction wavelength sweep may enable wavelength shift in-situ introduced by light travelling a length of optical waveguide to be automatically compensated. Therefore, any errors caused by inaccurate estimation of waveguide length may be eliminated. High wavelength sweep speeds and/or long waveguide lengths may be used without loss in wavelength measurement accuracy. This may be useful in a situation where the waveguide length changes due to system upgrading or when waveguide refractive index increases over time (e.g., in the presence of hydrogen).

Any of the operations described above, such as the operations 700, may be included as instructions in a computer-readable medium for execution by the receiver 130 or any other processing system. The computer-readable medium may comprise any suitable memory for storing instructions, such as read-only memory (ROM), random access memory (RAM), flash memory, an electrically erasable programmable ROM (EEPROM), a compact disc ROM (CD-ROM), or a floppy disk.

Those skilled in the art will also recognize that different aspects described herein may be combined, for some embodiments. As an example, for some embodiments, wavelength sweep control logic may be configured to perform different combinations of operations shown in the flow diagrams described above, to provide different combinations of features.

While the foregoing is directed to embodiments of the present invention, other and further embodiments of the invention may be devised without departing from the basic scope thereof, and the scope thereof is determined by the claims that follow.

The invention claimed is:

1. A method for interrogating optical elements having characteristic wavelengths spanning a sweep range, comprising:
   introducing a pulse of light, by an optical source, into an optical waveguide to interrogate at least a first set of optical elements having different characteristic wavelengths by performing a sweep of wavelengths over a period of the pulse,
   wherein the period is less than a round-trip time for light reflected from an optical element closest to the optical source to reach a receiver; and
   processing the reflected light to determine a parameter.

2. The method of claim 1, wherein the period of the pulse over which the sweep of wavelengths is performed, the characteristic wavelengths of the first set of optical elements, and spacing of the first set of optical elements define a first window corresponding to a time over which light reflected from the first set of optical elements is spread.

3. The method of claim 1, wherein processing the reflected light comprises distinguishing among response signals received from the first set of optical elements based on times at which the response signals are received, wherein the response signals comprise peaks in the reflected light.

4. The method of claim 2, wherein the pulse of light interrogates at least a second set of optical elements having different characteristic wavelengths and wherein the period of the pulse over which the sweep of wavelengths is performed, the characteristic wavelengths of the second set of optical elements, and spacing of the second set of optical elements define a second window corresponding to a time over which light reflected from the second set of optical elements is spread.

5. The method of claim 4, wherein the second window does not overlap the first window and wherein processing the reflected light comprises distinguishing among response signals received from the first and second sets of optical elements based on times at which the response signals are received.

6. The method of claim 4, wherein the characteristic wavelengths of the first set of optical elements match the characteristic wavelengths of the second set of optical elements.

7. The method of claim 6, wherein the characteristic wavelengths of the first set are in increasing wavelength order.

8. The method of claim 6, wherein the characteristic wavelengths of the first set are in decreasing wavelength order.

9. The method of claim 6, wherein the characteristic wavelengths of optical elements of the first set are in the same order as the characteristic wavelengths of optical elements in the second set.

10. The method of claim 6, wherein the characteristic wavelengths of optical elements in the first set are in reverse order of the characteristic wavelengths of optical elements in the second set.

11. The method of claim 10, further comprising:
introducing a second pulse of light, by the optical source, into the optical waveguide to interrogate the first and second sets of optical elements by performing a second sweep of wavelengths over the period of the second pulse, wherein the second sweep of wavelengths is in a reverse wavelength direction of the first sweep of wavelengths; and
calculating the round-trip time for each optical element by comparing relative shifts of peaks in the reflected light from the optical elements in the first sweep and the second sweep.

12. The method of claim 1, further comprising turning off the optical source or configuring the optical source to emit light at a wavelength that will not be reflected by any of the optical elements, after performing the sweep of wavelengths and until a next pulse of light is introduced.

13. An apparatus for interrogating optical elements having characteristic wavelengths spanning a sweep range, comprising:
an optical waveguide;
an optical source configured to introduce a pulse of light into the optical waveguide to interrogate at least a first set of optical elements having different characteristic wavelengths by performing a sweep of wavelengths over a period of the pulse;
a receiver, wherein the period is less than a round-trip time for light reflected from the optical element closest to the optical source to reach the receiver; and
a processing system configured to process the reflected light from the optical elements to determine a parameter.

14. The apparatus of claim 13, wherein the period of the pulse over which the sweep of wavelengths is performed, the characteristic wavelengths of the first set of optical elements, and spacing of the first set of optical elements define a first window corresponding to a time over which light reflected from the first set of optical elements is spread.

15. The apparatus of claim 13, wherein the processing system is configured to process the reflected light by distinguishing among response signals received from the first set of optical elements based on times at which the response signals are received and wherein the response signals comprise peaks in the reflected light.

16. The apparatus of claim 14, wherein the pulse of light interrogates at least a second set of optical elements having different characteristic wavelengths and wherein the period of the pulse over which the sweep of wavelengths is performed, the characteristic wavelengths of the second set of optical elements, and spacing of the second set of optical elements define a second window corresponding to a time over which light reflected from the second set of optical elements is spread.

17. The apparatus of claim 16, wherein the second window does not overlap the first window and wherein the processing system is configured to process the reflected light by distinguishing among response signals received from the first and second sets of optical elements based on times at which the response signals are received.

18. The apparatus of claim 16, wherein the optical elements in the first and second sets of optical elements have the same characteristic wavelengths.

19. The apparatus of claim 18, wherein the characteristic wavelengths of optical elements in the first set are in reverse order of the characteristic wavelengths of optical elements in the second set.

20. A system for interrogating optical elements having characteristic wavelengths spanning a sweep range, comprising:
a wellbore;
an optical waveguide at least partially disposed in the wellbore;
an optical source configured to introduce a pulse of light into the optical waveguide by performing a sweep of wavelengths over a period of the pulse;
at least a first set of optical elements disposed along the optical waveguide and having different characteristic wavelengths which reflect interrogating light at the characteristic wavelength;
a receiver, wherein the period is less than a round-trip time for light reflected from the optical element closest to the optical source to reach the receiver; and
a processing system configured to process the reflected light from the optical elements to determine a parameter.

* * * * *